E. E. QUIMBY.
MAGNETIC HOLDERS FOR FEEDING SCREW AND OTHER BLANKS.

No. 186,755. Patented Jan. 30, 1877.

WITNESSES:
E. H. Williams
Geo. W. Miatt

INVENTOR:
Edw. E. Quimby

UNITED STATES PATENT OFFICE.

EDWARD E. QUIMBY, OF ORANGE, NEW JERSEY, ASSIGNOR TO AMERICAN SCREW COMPANY, OF PROVIDENCE, RHODE ISLAND.

IMPROVEMENT IN MAGNETIC HOLDERS FOR FEEDING SCREW AND OTHER BLANKS.

Specification forming part of Letters Patent No. 186,755, dated January 30, 1877; application filed October 20, 1876.

*To all whom it may concern:*

Be it known that I, EDWARD E. QUIMBY, of Orange, New Jersey, have invented an Improvement in Devices for Feeding Iron or Steel Blanks to Automatic Machines, of which the following is a specification:

My improvement relates to the use of magnets for holding iron or steel objects in prescribed position while such objects are being transferred from one part of a machine and delivered to another part of the machine.

My invention consists in forming the poles of the magnet into shapes corresponding with the shape of the object which is to be carried at the points where it is to be held by magnetic adhesion; and my invention also includes a divided armature, composed of two pieces of soft iron, each presenting a flat surface at one end for contact with the flat surface of the magnet at its poles, while the other ends of the soft-iron pieces are formed into the required shapes to enable them to engage particular parts of the object which is to be carried.

I have applied my invention to a machine for the manufacture of wood-screws, which is fully described in the application which I have prepared preparatory to obtaining Letters Patent of the United States therefor. In that application, my magnetic feeding device is described and claimed in combination with devices for delivering small objects of iron or steel to the magnetic carrier, and also in combination with devices for receiving such objects from the magnetic carrier.

My present application relates to the construction of the magnetic carrier itself, without reference either to devices which deliver objects to the magnet or to devices which receive objects from the magnet.

In my magnetic carrier, the object carried constitutes either the armature which connects the poles of the magnet, or the link which completes the magnetic circuit, and my invention consists in fitting the poles of a magnet to grasp or adhere to particular parts of an object, for the purpose of holding the object in a prescribed position.

If the parts of the object to which it is desired the magnet shall adhere present curved surfaces or protuberances, the poles of the magnet are recessed to conform to the shape of such curves or protuberances. If the parts of the object to be seized present cavities, the poles of the magnet are respectively formed of suitable shape to enter such cavities.

For the purpose of increasing the range of usefulness of my invention, instead of recessing or pointing the poles of the magnet itself, I provide the magnet with a divided armature composed of two pieces of soft iron, which are respectively secured to the opposite poles of the magnet, or are so arranged as to be in magnetic contact with the opposite poles, and which are of such shape as may be required by the circumstances of the case in which they are to be used. These pieces of soft iron, each of which is at one end in contact with a pole of the magnet, form a part of a magnetic circuit which is completed when the opposite ends of the pieces of soft iron are brought into contact with the object to be carried.

The divided armature has two advantages: First, the two pieces of soft iron composing it may be made a part of the permanent structure of the machine in which the carrier is to be used, and be of any required size and shape; as, for example, the two halves of the armature may be prolonged into thin stems or plates, capable of entering a narrow aperture in the machine, or a narrow space between two adjacent parts of the machine— that is, a space too small to allow the passage of the magnet itself. The second advantage is, that the magnet may be detached from the armature-pieces without altering the position or adjustment of the armature-pieces in relation to each other or to the other parts of the machine in conjunction with which the carrier operates.

When the energy of the magnet becomes enfeebled it may thus be conveniently removed, and a stronger magnet substituted in its place, while the enfeebled magnet is being remagnetized. Of course, if an electro-magnet is used there will be no necessity for removing the magnet for the purpose indicated, but it will be found much more convenient to use fixed magnets, and I have therefore especially organized the construction of my magnetic carrier with reference to the use of fixed magnets.

The accompanying drawings illustrating my invention are as follows: Figures 1 and 2 are perspective views of an ordinary horseshoe-magnet, provided with a detachable divided armature, the opposed edges of which, upon one side of the magnet, are recessed to receive a rounded object—as, for example, a portion of the head of a round-headed screw-blank. Fig. 3 is a perspective view of a divided armature, terminating in thin plates slightly curved at their outer extremities, and grooved for the purpose of seizing a cylindrical object—as, for example, the small wire used in making blind staples. Fig. 4 is a similar perspective, showing a divided armature terminating in two stems, pointed at their ends to fit them to enter cavities in the surface of the object which is to be carried.

In the drawings, an ordinary horseshoe-magnet, A, is shown in connection with divided armatures B B. In Figs. 1 and 2, which are perspective views from opposite sides of the same structure, the armatures are composed of the angle-pieces B B, which are in magnetic contact with the ends and a portion of the sides of the two legs of the magnet. These angle-pieces are secured to a plate, $c$, of wood, or some other non-magnetic substance, which separates the edges of the angle-pieces from each other, and maintains them in proper position with relation to each other, and with relation to that part of the legs $c^1 c^1$ of the magnet with which the angle-pieces are in magnetic contact. The wooden cross-piece $c^2$ is secured by the screws $c^3 c^3$ to the plate $c$, and clamps the legs of the magnet against the inner sides of the angle-pieces.

The plate $c$, which may be made of brass, if necessary, is to be secured to the part of the machine which gives motion to the carrier.

When it is desired to remove the magnet, the screws $c^3 c^3$ are taken out, which permits the detachment of the clamp or cross-piece $c^2$. The magnet may then be slid away from the angle-pieces, and another magnet substituted in its place.

It will thus be seen that the armature, considered as a structure by itself, consists of two pieces of soft iron of the desired shape, secured in proper position to a non-magnetic substance, for the purpose of permitting the convenient application of the magnet, as described.

The cross-piece or clamp, by which the magnet is mechanically held in contact with the armature, may be arranged in the position shown, or in any other convenient position, according to circumstances.

In the structure shown in Figs. 1 and 2 the recesses $d\ d$ are formed on the outer sides of the angle-pieces, and, taken together, present a shallow concavity, suitable for the reception of a slightly-rounded object, partaking of the shape of an oblate spheroid.

Figure 1:
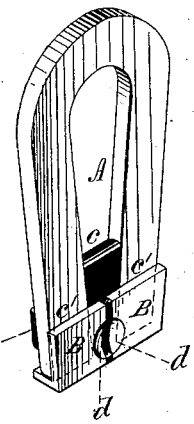
Figure 3:
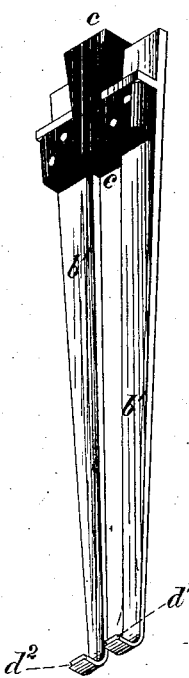
Fig. 3 represents a structure in which the angle-plates of the divided armature are provided with long slender blades $b'\ b'$, slightly curved at their outer ends, and provided with the grooves $d^2\ d^2$, to fit them, to embrace a cylindrical object or wire at two different points.
Figure 4:
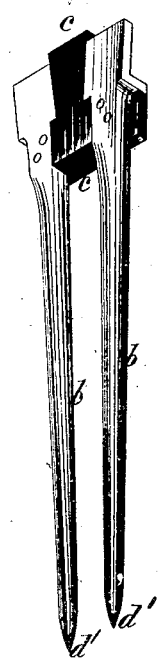
Fig. 4 represents the angle-pieces of the divided armature provided with long pointed stems $b\ b$, the points $d^1\ d^1$ being fitted to enter corresponding cavities in the object to be carried.
Figure 2:
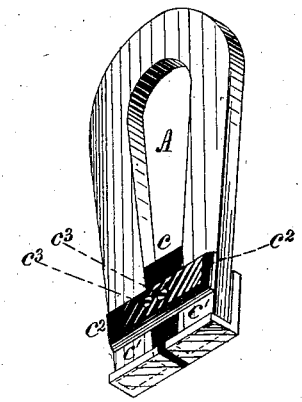

It will, of course, be understood that in applying my invention to any machine the length, breadth, and shape of the two angle-pieces, stems, or blades, will be varied according to the exigencies of the occasion, having regard to the size and shape of the space which the machine affords, to the size and shape of the objects to be carried, to the position in which such objects are required to be held and presented, and to the nature of the motion which the carrier is required to make.

In all cases the object carried constitutes the link which connects the two poles of the magnet or the two parts of the divided armature; or, in other words, closes the magnetic circuit; and in all cases the object carried is securely held in the desired position by the magnetic adhesion to it of two parts of the armature, which correspond in shape to the shape of those parts of the object carried with which the magnetic contact is made.

What I claim as my invention is—

1. A magnetic carrier consisting of a magnet provided at its poles with two pieces of soft iron of prescribed dimensions and shapes, such pieces of soft iron presenting, in suitable proximity, two surfaces or points conforming to particular parts of an object which the carrier is required to hold in prescribed position by magnetic adhesion.

2. A divided armature, composed of two pieces of soft iron of prescribed dimensions and shape, secured to a non-magnetic material, in such relation as to present two surfaces for adhesion to the opposite poles of a magnet, and two surfaces or points corresponding in position and shape to the position and shape of two parts of an object intended to be held in prescribed position by magnetic force.

3. The combination of a magnet, and a divided armature, with a detachable clamp, for the purpose of mechanically maintaining the contact of the poles of the magnet with the soft-iron pieces composing the divided armature.

EDW. E. QUIMBY.

Witnesses:
EDWD. PAYSON,
GEO. W. MIATT.